Oct. 21, 1952   W. A. FUTTERER   2,614,531
POULTRY DRINKING VALVE
Filed Nov. 29, 1947
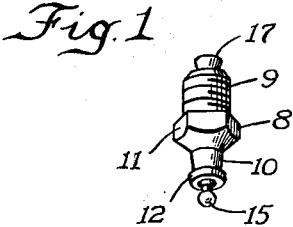
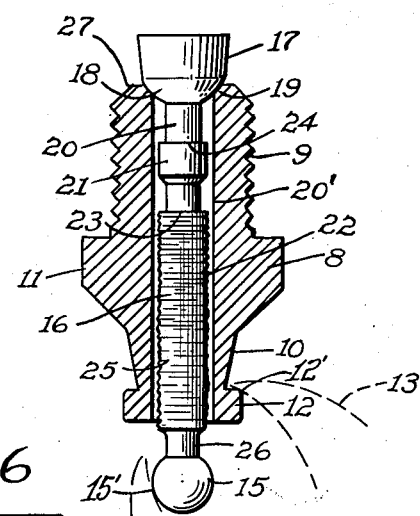
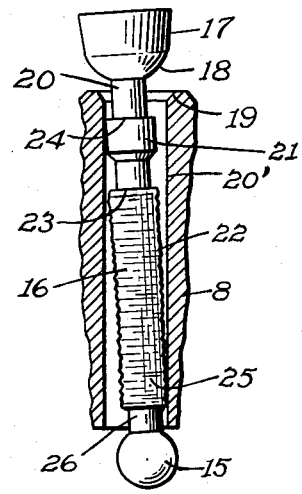
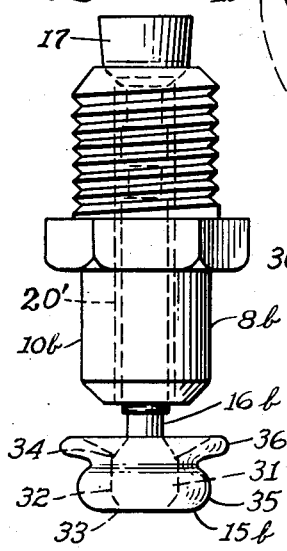
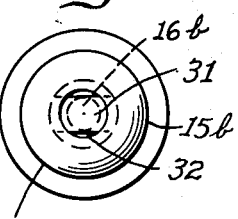
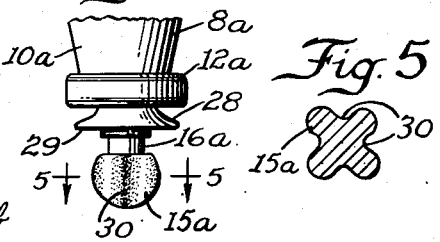
Inventor
Wolfram A. Futterer
Atty.

Patented Oct. 21, 1952

2,614,531

UNITED STATES PATENT OFFICE 2,614,531

POULTRY DRINKING VALVE

Wolfram A. Futterer, Woodstock, Ill.; Frances L. Futterer, executrix of said Wolfram A. Futterer, deceased, assignor to Broiler Equipment Company, Parsonsburg, Md., a copartnership Application November 29, 1947, Serial No. 788,902

7 Claims. (Cl. 119—72.5)

This invention relates to poultry drinking valves of the type in which the stem of the valve projects downwardly from the valve body and is arranged to be raised by the chick or chicken in drinking.

Valves of the kind mentioned have been more and more widely used because of sanitation and the saving in labor and water realized with them, although they are subject to a number of rather serious practical objections when constructed as heretofore designed. One of the principal objections to prior constructions is that the stem is apt to get stuck in an open or closed position, by reason of dirt or grit lodging under the valve head, or because of an accumulation of dirt or lime in the bore through which the stem extends. Another objection is that the valves as heretofore designed have not been operable with equal facility by different sized chickens, the knob on the lower end of the stem being of a size and shape suitable usually only for the beak of a full-grown chicken and much too large for the smaller beaks of little and even medium sized ones. Still another objection to prior valves is that the water is not properly directed by these valves, because it is discharged along the outside of the stem, so that some is quite apt to be spilled alongside the chicken's beak instead of running into it. Here again the design of the operating knob on the lower end of the stem is obviously an important factor, because if the knob takes up too much space in the beak opening, it, naturally, obstructs fluid flow into the beak, and the water that does not run into the beak is, of course, wasted. It is, therefore, the principal object of my invention to provide poultry drinking valves which avoid, or at least reduce to a minimum, the objections mentioned above, the valves of my invention having one or more of the following features:

(1) A spheroidal valve head in combination with an integral stem that is of reduced diameter in relation to the bore in the body, so that likelihood of sticking of the stem is reduced and the valve is assured of closing tightly after each operation, because the spheroidal bottom face of the valve head is always in the same relationship to the circular valve seat at the upper end of the bore, regardless of the angle of inclination of the stem in the bore;

(2) The stem is rather coarsely grooved circumferentially to give a filing or broaching action in the bore in the reciprocatory movement of the stem relative to the body in the use of the valve, whereby to wear away any dirt or lime that might otherwise form a coating therein and ultimately interfere with the freedom of operation of the valve;

(3) The lower end of the body and/or stem is designed to fit both larger and smaller sized beaks with equal facility, for equal convenience in drinking by different sized chickens;

(4) The operating knob on the stem, or the operating end of the stem, is designed to permit discharge of water through the end that is entered in the chicken's beak, whereby to facilitate the chicken's drinking and avoid wasting water, and (5) The stem has an elongated reduced portion directly below the valve head, intermediate the ends of which is an enlarged cylindrical portion of approximately the same diameter as the rest of the lower end portion of the stem, and a sharp annular ridge is defined on the stem both at the lower end of the reduced portion and on the top of the intermediate enlargement, and these sharp ridges also are adapted to give a filing or broaching action to clean out lime, or other deposits, in the bore and help to dislodge adhering particles of any foreign matter and eject those that are too large to pass through the bore.

The invention is illustrated in the accompanying drawing, in which—

Fig. 1 is a perspective view of a poultry drinking valve made in accordance with my invention and shown approximately full size;

Fig. 2 is a central longitudinal section through the valve of Fig. 1, with the valve stem shown in elevation, on a larger scale;

Fig. 3 is a view similar to Fig. 2 but with certain parts broken away, showing the valve opened part way;

Fig. 4 is a fragmentary elevation showing a valve of modified or alternative construction;

Fig. 5 is an enlarged sectional detail on the line 5—5 of Fig. 4;

Fig. 6 is a side view of another valve of modified or alternative construction, and Fig. 7 is an end view of the stem of the valve shown in Fig. 6.

Similar reference numerals are applied to corresponding parts throughout the views.

Referring first to Figs. 1 to 3, the reference numeral 8 designates the elongated body of a poultry drinking valve made in accordance with my invention, having a threaded shank portion 9 adapted to thread into a hole provided therefor in a container, or in a conduit extending from the container, wherein a predetermined head of water is maintained by means of a float operated shut-off valve associated with a water supply conduit arranged to discharge into the container. The body 8 is installed in the position illustrated in Fig. 2, with the threaded shank portion 9 uppermost and with the tapered reduced portion 10 lowermost, the enlarged faceted intermediate portion 11 being adapted to fit a wrench used in threading the body 8 in place. An annularly projecting bead 12 establishing a peripheral shoulder 12' is provided on the lower end of the body, onto which shoulder 12' the chicken will engage its upper beak, as indicated in dotted lines at 13 in Fig. 2, when drinking, the lower beak 14 engaging the under portion of valve operating knob 15 at approximately point 15' provided on the lower end of the valve stem 16 to open the valve, as shown in Fig. 3. Fig. 1 is drawn to approximately full scale and hence it will be seen that the distance from the lower beak contacting point 15' on knob 15 to the upper beak contacting shoulder 12' is approximately 1/4" to 5/16" which is well within the limit of the maximum span between the upper and lower beaks 13, 14 of the average sized fowl. The stem 16 has a valve head 17 on its upper end, the bottom of which is of spheroidal shape, as indicated at 18, and is adapted to engage a circular beveled seat 19 provided on the body 8 at the upper end of the central longitudinal bore 20'. The knob 15 is small enough to pass through the bore 20', and the valve is assembled by entering this end of the stem in the upper end of the bore, the head 17, being of larger diameter than the bore, serving to support the stem in its final assembled position, as shown in Fig. 2. Immediately below and concentric with the head 17, the stem 16 has an elongated cylindrical reduced portion 20, and intermediate the ends of this reduced portion is an enlarged cylindrical portion 21 concentric with the reduced portion 20 and the unreduced remainder 22 of the lower end portion of the stem. Sharp annular scraping edges 23 and 24 are defined at the upper end of the unreduced portion 22 and on top of the enlarged portion 21, respectively. The periphery of the enlarged portion 21 is smooth, but the periphery of the unreduced portion 22 is rather coarsely grooved or serrated circumferentially, as indicated at 25. The lower end portion of the stem is preferably also reduced, at 26, for a short distance above the operating knob 15.

In operation, the valve is normally closed, as shown in Fig. 2, and the conical-shaped upper end 27 of the body protrudes above the bottom of the container or conduit, thereby reducing likelihood of foreign particles lodging on or around the valve seat 19 and interfering with proper seating of the valve. Most chickens, in drinking, will operate the valve in the manner indicated in dotted lines at 13—14 in Fig. 2, using the shoulder 12' on projecting bead 12 as a basis for applying lifting force on the knob 15. Others may take hold of just the knob 15. In either event, water is discharged through the bore 20 along the stem 16 and into the chicken's mouth, most efficient watering being, of course, obtained when the chicken operates the valve in the preferred manner illustrated. Due to the fact that the valves are set at a predetermined elevation, the chicken's head is tilted back, in the correct position for drinking. The watering of poultry in this manner is obviously more satisfactory all around, because of better sanitation and less wasting of water, and the less work and care required on the part of the owner. The valve is not apt to leak because the valve is assured of correct seating of the spheroidal bottom face 18 of the valve head on the circular seat 19 regardless of the angle of inclination of the stem 16 in the bore 20'. If there are any foreign particles adhering in the bore 20' in the vicinity of the valve seat 19, the up and down movement of the valve soon dislodges or ejects them, because of the filing or scraping action of the edges 23 and 24 in the upper end portion of the bore 20'. Furthermore, if the bore tends to become coated with dirt or lime, the roughened periphery 25 of the unreduced lower end portion 22 of the stem 16 serves to wear away the coating in the reciprocatory movement of the stem, so that the valve is self-cleaning and is not apt to get clogged and stuck.

Referring to Figs. 4 and 5, 8a designates the body of another valve, only the lower half portion of which is illustrated, it being understood that the upper half is like that shown in Figs. 2 and 3. The tapered lower end portion 10a has a projecting annular bead 12a providing one annular shoulder on the top thereof in the same space relationship to the knob 15a on the lower end of the valve stem 16a, as is shown in the construction of Fig. 2 between bead 12 and knob 15, but in the present construction a flared tip portion 28 is provided on the lower end of the body 8a below the bead 12a and preferably of smaller diameter than the bead 12a, the edge portion 29 of which provides another annular shoulder on the top thereof that is much closer to the knob 15a than the bead 12a, so that smaller sized chickens can operate the valve equally as well as the larger sized ones without having to open the mouth to an abnormal degree. For instance, little chicks can readily operate a valve of this design, because of the small span between beaks required when the upper beak is engaged on the rim 29 and the lower beak on the knob 15a. The knob 15a is shown as of generally spheroidal form and is provided with longitudinally extending channels such as, for example, exterior grooves, as indicated at 30 in Fig. 5, whereby to permit discharge of water through the operating end of the stem instead of around the outside of the knob and accordingly facilitate the chickens' drinking and avoid wasting water. The construction and operation of this drinking valve is otherwise the same as that disclosed in Figs. 1 to 3.

Referring to Figs. 6 and 7, the reference numeral 8b designates the body of another valve designed to operate in a generally similar manner as the valves of Figs. 2 and 4, but having the lower end portion 10b of the body without any projecting bead 12 or 12a or 28. The stem 16b for the valve 17 has a paddle-shaped cross-head 31 provided on the lower end thereof, fitting snugly in the bore 32 of the operating knob 15b, which, in this case, is a separate sleeve element assembled on the lower end of the stem. There is a slight taper in the lower end of the bore 32, as indicated at 33, which limits the movement of the cross-head 31 downwardly relative to the knob 15b, and the knob is crimped or swedged inwardly above the cross-head 31, as indicated at 34, to fasten the parts permanently in assembled relationship. The lower portion 35 of the knob 15b is of spheroidal shape and of a smaller diameter than the annular rim portion 36 provided on the top thereof, and in that way larger and smaller sized beaks are accommodated on the operating knob for the equal convenience of different sized chickens in drinking. The smaller sized chickens will take hold of the knob on the reduced lower portion 35, and the larger sized chickens may take hold of the knob partly on the lower reduced portion 35 from one side and the enlarged upper portion 36 on the other side, or may enter the entire knob in the mouth. In any event, water is discharged through the bore 32 in the knob 15b and the chickens' drinking is thereby greatly facilitated, and there is must less danger of water being wasted than where the water has to flow around the outside of the knob. The construction of this drinking valve is otherwise the same as that shown in Fig. 2.

It is believed the foregoing description conveys a good understanding of the objects and advantages of my invention. The appended claims have been drawn to cover all legitimate modifications and adaptations.

I claim:

1. A poultry drinking valve comprising an elongated body having a cylindrical bore therethrough providing at one end a valve seat and at its other end at least one external peripheral shoulder, a valve stem of smaller cross-sectional area than that of said bore extending through said bore, said stem having at one end a valve head normally positioned in said seat, and said stem having at its other end an operating knob, said knob and said shoulder being in cooperative relationship and being spaced apart by a distance within the limit of the span of a fowl's open beak.

2. A poultry drinking valve as defined in claim 1 wherein said knob is provided with longitudinally extending channels to direct water into the lower open beak of the fowl.

3. A poultry drinking valve as defined in claim 2 wherein said channels are constituted by grooves provided on the exterior surface of said knob.

4. A poultry drinking valve as defined in claim 1 wherein the end of said valve body is provided with a pair of peripheral shoulders disposed in superposed relation above said knob, the shoulder nearest said knob being smaller than the other in transverse dimension so as to adapt said valve for use by fowls of different sized beaks.

5. A poultry drinking valve as defined in claim 1 wherein said valve stem is sized to reciprocate in said bore with appreciably more than operating clearance throughout the length thereof and the surface of said valve stem is provided with serrations which scrape against the wall of the bore in said valve body.

6. A poultry drinking valve as defined in claim 1 wherein said valve stem includes a scraping edge defined by the periphery of a shoulder disposed on the upper end portion of said stem below said valve head.

7. A poultry drinking valve as defined in claim 1 wherein said valve stem includes a pair of scraping edges in longitudinally spaced relation and which are defined respectively by the peripheries of shoulders disposed on the upper end portion of said stem below said valve head.

WOLFRAM A. FUTTERER.

REFERENCES CITED

The following references are of record in the file of this patent:

UNITED STATES PATENTS

| Number | Name | Date |
| --- | --- | --- |
| 141,416 | Bailey | Aug. 5, 1873 |
| 532,779 | Grubb et al. | Jan. 22, 1895 |
| 1,165,673 | Holmes | Dec. 28, 1915 |
| 1,257,910 | Meves | Feb. 26, 1918 |
| 1,467,492 | Olson | Sept. 11, 1923 |
| 1,811,375 | Wysong | June 23, 1931 |
| 1,903,767 | Karst | Apr. 18, 1933 |
| 1,916,513 | Jones | July 4, 1933 |
| 1,918,566 | Sadleir | July 18, 1933 |
| 2,073,112 | Lindinger | Mar. 9, 1937 |
| 2,325,503 | Goble | July 27, 1943 |